United States Patent [19]

Broekhuis

[11] Patent Number: 4,775,718

[45] Date of Patent: Oct. 4, 1988

[54] MODIFIED POLYESTER, METHODS OF PREPARING SAME AND COMPOSITIONS COMPRISING SAID MODIFIED POLYESTER

[75] Inventor: Antonius A. Broekhuis, Amsterdam, Netherlands

[73] Assignee: Shell Oil Company, Houston, Tex.

[21] Appl. No.: 948,374

[22] Filed: Dec. 31, 1986

[51] Int. Cl.$^4$ .................. C08L 67/06; C08L 63/10
[52] U.S. Cl. ........................ 525/69; 525/44; 525/92; 525/112; 525/122; 525/171; 525/531; 525/63
[58] Field of Search ............ 525/44, 171, 69, 112, 525/122, 92, 531, 63

[56] References Cited

U.S. PATENT DOCUMENTS

| | | | |
|---|---|---|---|
| 3,004,003 | 10/1961 | Batzer | 525/313 |
| 3,078,253 | 2/1963 | Davies | 525/44 |
| 3,179,623 | 4/1965 | Bowen | 260/47 |
| 3,231,635 | 1/1966 | Holden et al. | 260/880 |
| 3,256,266 | 6/1966 | Burt | 260/97.5 |
| 3,301,743 | 1/1967 | Fekete et al. | 161/194 |
| 3,317,465 | 5/1967 | Doyle et al. | 260/47 |
| 3,367,992 | 2/1968 | Bearden | 260/837 |
| 3,377,406 | 4/1968 | Newey et al. | 260/837 |
| 3,489,707 | 1/1970 | Fry | 260/31.6 |
| 3,705,208 | 12/1972 | Nakamuta | 525/171 |
| 3,892,819 | 7/1975 | Najvar | 528/112 |
| 3,925,299 | 12/1975 | Phillips | 260/40 R |
| 3,925,300 | 12/1975 | Roberts et al. | 260/40 R |
| 4,238,202 | 12/1980 | Trepka et al. | 44/62 |
| 4,465,808 | 8/1984 | Dix | 525/171 |

Primary Examiner—Patricia Short

[57] ABSTRACT

An elastomeric homopolymer or copolymer is reacted with or, in effect, grafted onto an unsaturated polyester and the reaction product or graft polymer may then be used in a thermosetting unsaturated polyester resin composition. The chemical linkage between the elastomeric polymer and the unsaturated polyester is a cyclic structure comprising 6 carbon atoms. The chemical bond is achieved by first treating the elastomeric polymer to incorporate a conjugated diolefin structure and then adding the conjugated diolefin group to an ethylenically unsaturated group in the polyester or a monomeric dienophile. When added to a monomeric dienophile, the polyester is then grafted onto the elastomeric polymer at the site of the monomeric dienophile. The chemical linkage or bonding occurs through a 4+2 Diels Alder addition. The reaction or grafting effectively incorporates an elastomer segment into the thermosetting polyester resin composition and imparts improved surface characteristics and impact resistance without risk of destructive phase separation which has, heretofore, occurred when thermoplastic elastomers were incorporated into thermosetting polyester resin compositions.

32 Claims, No Drawings

MODIFIED POLYESTER, METHODS OF PREPARING SAME AND COMPOSITIONS COMPRISING SAID MODIFIED POLYESTER

BACKGROUND OF THE INVENTION

1. Field of the Invention

This invention relates to a thermosetting polymer, to methods for preparing said thermosetting polymer and to a composition comprising said polymer. More particularly, this invention relates to a modified polyester, to methods for preparing said modified polyester and to a thermosetting resin composition containing said modified polyester.

2. Prior Art

The use of unsaturated polyesters in thermosetting resin compositions is, of course, well known in the prior art. Generally, these compositions comprise an unsaturated polyester, a vinyl monomer, a curing agent and a filler. The thermal setting resin composition may also comprise other additives, such as reinforcing agents, anti-shrinking agents and thickeners. In this regard, it should be noted that anti-shrinking agents are commonly used to improve surface characteristics whereas thickeners are used to increase the viscosity of the uncured composition prior to molding.

In general, unsaturated polyester resin compositions exhibit excellent rigidity, heat resistance and electrical characteristics when used in thermosetting applications. In some applications, however, such as the bulk molding and sheet molding applications, improved impact resistance and improved surface characteristics (less shrinkage) are required or at least desired. As indicated in the background section of U.S. Pat. No. 4,329,438 several methods have, heretofore, been proposed for improving the impact resistance and the surface characteristics of such unsaturated polyester resin compositions. These methods include the addition of either a diolefin rubber or a styrene-diolefin block copolymer to the resin compositions. Moreover, it is known to use carboxylated derivatives of styrene-butadiene block copolymers as additives in polyester resin compositions for this same purpose. As indicated in the background section of said U.S. Pat. No. 4,329,438, however, these methods have not been completely successful due, primarily, to the incompatibility of the rubber polymer in the composition and the resulting destructive phase separation and bleeding of the rubber to the surface. Another difficulty with the proposed prior art solutions to the problem, particularly in those cases where a block copolymer is used, is solubility of the block copolymer in the vinyl monomer which functions both as a crosslinking agent and as a solvent in the composition.

U.S. Pat. No. 4,329,438 teaches yet another method for solving the destructive phase separation problem wherein a carboxylated derivative of a styrene-butadiene block copolymer is used. Specifically, the styrene-butadiene block copolymer is modified by grafting an unsaturated dicarboxylic acid and/or an unsaturated dicarboxylic acid derivative onto the block copolymer. According to the disclosure, significant improvement is realized but destructive phase separation and the associated rubber bleeding is apparently not completely eliminated since the block copolymer and the unsaturated polyester remain as a physical admixture in the thermosetting resin composition.

U.S. Pat. No. 3,892,819 teaches still another method of solving a compatibility problem in a vinyl ester composition wherein a carboxylated derivative of a polydiene rubber is used. Particularly, this patent teaches that when a polydiene rubber is first treated so as to contain terminal carboxyl groups, the carboxyl groups may then be reacted with epoxy groups contained in the backbone of a polyvinyl ester. The polydiene rubber is, then, chemically bonded to the polyvinyl ester and, therefore, not subject to destructive phase separation so long as the chemical bond remains intact. The ester bond actually used in the thus modified polyvinyl ester is, of course, relatively weak and may be broken under certain conditions. Should this occur prior to curing of the resin composition destructive phase separation and the associated rubber bleeding would again surface. There is, then, a need for a still better way for incorporating a rubber or a thermoplastic elastomeric polymer into a thermosetting polyester resin composition.

3. Summary of the Invention

It has now been discovered that the forgoing and other disadvantages of the prior art polyester resin compositions can be overcome or at least significantly reduced with the modified polyester of this invention and an improved thermosetting polyester resin composition provided therewith. It is, therefore, an object of the present invention to provide a modified polyester, methods of preparing the same and a thermosetting polyester resin composition containing the same. It is another object of this invention to provide such a modified polyester which when formulated into a thermosetting polyester resin composition will not be subject to destructive phase separation. It is a still further object of the present invention to provide such a modified polyester which, when formulated into a thermosetting polyester resin composition and cured, will yields a molded product having improved impact resistance. It is yet another object of this invention to provide such a modified polyester which, when formulated into a thermal setting polyester resin composition and cured, will yield a molded product exhibiting less shrinkage, and hence, better surface characteristics. The forgoing and other objects and advantages will become apparent from the description set forth hereinafter.

In accordance with the present invention, the foregoing and other objects and advantages are accomplished by modifying an unsaturated polyester and by incorporating the modified unsaturated polyester into a thermosetting polyester resin composition. The unsaturated polyester of this invention is modified by chemically incorporating a treated elastomeric homopolymer or copolymer into the backbone of said polyester through a relatively stable chemical bond, which elastomeric homopolymer or copolymer is frequently referred to herein as an elastomeric polymer. The elastomeric homopolymer or copolymer may be chemically bonded to the unsaturated polyester by reacting the polyester with an elastomeric homopolymer or copolymer, which copolymer may be either random or block, comprising a conjugated diolefin linkage or by grafting the polyester onto such an elastomeric homopolymer or copolymer. The chemical bonding is accomplished by reacting the conjugated diolefin group of the elastomeric homopolymer or copolymer with an ethylenic unsaturation contained in a preformed polyester or with an ethylenic unsaturation of a monomer useful in preparing such a polyester via a Diels Alder condensation or cyclization. The Diels Alder addition reactin will be accomplished at typical Diels Alder reaction conditions. The modified unsaturated polyester thus produced will exhibit good impact resistance and may be used in a thermosetting composition. The thermosetting resin composition will also comprise a vinyl monomer, a curing agent and other additives as desired or required.

4. Detailed Description of the Invention

As indicated, supra, the present invention relates to a modified polyester, to methods for preparing said modified polyester and to an improved unsaturated polyester resin composition, which improved unsaturated polyester resin composition exhibits good impact strength when cured and, therefore, may be used with advantage in various molding applications and particularly sheet molding and bulk molding applications. The improved unsaturated polyester is, in effect, a conventional unsaturated polyester modified by chemically incorporating an elastomeric homopolymer or copolymer containing a conjugated diolefin linkage. The chemical incorporation is through a Diels Alder addition reaction between the conjugated diolefin linkage of the elastomeric homopolymer or copolymer with a vinyl unsaturation in the unsaturated polyester or in a monomer subsequently used to prepare such a polyester. The modified unsaturated polyester of this invention may be prepared in at least two ways. Firstly, both an unsaturated polyester and an elastomeric homopolymer or copolymer may be separately produced, the elastomeric homopolymer or copolymer then chemically treated so as to incorporate a conjugated diolefin structure and the thus treated elastomeric homopolymer or copolymer then reacted with the unsaturated polyester at Diels Alder reaction conditions. Alternatively, the elastomeric homopolymer or copolymer may be first produced, chemically treated so as to incorporate a conjugated diolefin linkage, reacted with a suitable monomeric dienophile and then incorporated into the unsaturated polyester by grafting the polyester onto the elastomeric homopolymer or copolymer at the site of said dienophile.

The unsaturated polyesters which may be modified in the present invention include: those polyesters prepared through the condensation of an unsaturated dicarboxylic acid, an unsaturated dicarboxyclic anhydride or a mixture thereof with a dihydric alcohol or mixture thereof and those prepared by condensing an unsaturated monocarboxylic acid with a polyepoxide. Since the modification consists of a 4+2 Diels-Alder cycloaddition reaction, however, it is essential to the present invention that the unsaturated polyester contain at least one dienophile group; i.e., a polar group or a substituted polar group, preferably a carboxyl group, adjacent to a carbon-carbon double bond in the unsaturated polyester structure. Most preferably, the unsaturated polyester will contain at least one group having a carboxyl group adjacent to each of the carbon atoms in a carbon carbon double bond.

Suitable unsaturated polyesters prepared from an unsaturated dicarboxylic acid and/or an anhydride thereof and a polyhydric alcohol include unsaturated polyesters obtained by replacing up to 90 mol% of the unsaturated dicarboxylic acid or anhydride thereof with a saturated dicarboxylic acid or an anhydride thereof. Suitable dicarboxylic acids or anhydrides include maleic, fumeric, itaconic, citraconic, chloromaleic, mesaconic, glutaconic and the like. Suitable saturated dicarboxylic acids or anhydrides which may be substituted for a part of the unsaturated dicarboxylic acid or anhydride include, but are not necessarily limited to, phthalic, succinic, adipic, azeleic, isophthalic, chloroendric, tetraflorophthalic and the like. Suitable dihydric alcohols include, but are not necessarily limited to, linear glycols such as ethylene glycol, propylene glycol, dipropylene glycol, diethylene glycol, 1,3-butanediol, neopentyl glycol, 1,4-cyclohexane dimethanol mixtures of these glycols and cyclohexane dimethanol with hydroxy-alkyl ethers of bisphenol A and the like. Suitable unsaturated polyesters include those described in U.S. Pat. Nos. 3,925,299, 3,925,300, and 3,489,707, the disclosure of which patents are herein incorporated by reference. In general, these polyesters are produced by condensing the dicarboxylic acid or anhydride or mixture thereof with a dihydric alcohol or mixture thereof at a temperature within the range of from about 30° C. to about 205° C. The condensation reaction is usually terminated when an acid number less than about 100 is reached most frequently by use of an indicator such as toluhydroquinone, hydroquinone, a methyl ester of hydroquinone, m-dinitrobenzene and the like.

Suitable polyvinyl esters include those described in U.S. Pat. Nos. 3,179,623; 3,256,266; 3,301,743; 3,317,465; 3,367,992 and 3,377,406, the disclosure of which patents are all incorporated herein by reference. In general, unsaturated monocarboxylic acids useful in such polyvinyl esters include acrylic acid, methacrylic acid, halogenated acrylic or methacrylic acids, cinnamic acid, various half esters of dicarboxylic acids such as the half esters of hydroxyalkyl acrylate or methacrylate wherein the hydroxyalkyl group preferably has from 2 to 6 carbon atoms and the like. Polyepoxides which may be used in polyvinyl esters include, but are not necessarily limited to, glycidyl polyethers of both polyhydric alcohols and polyhydric phenols, flame retardant epoxy resins based on tetrabromo bisphenol A, epoxy novolacs, epoxidized fatty acids or drying oil acids, epoxidized diolefins, epoxidized diunsaturated acid esters, epoxidized unsaturated polyesters containing more than one oxirane group per molecule and the like. The polyepoxides may be monomeric or polymeric.

In general, any elastomeric polymer known in the prior art may be chemically treated to incorporate a conjugated diolefin linkage and then used to modify a polyester in accordance with this invention. Useful elastomeric polymers, then, include those prepared in bulk, suspension, solution or emulsion. As is well known, polymerization of monomers to produce an elastomer may be accomplished using free-radical, cationic and anionic initiators or polymerization catalyst. As indicated more fully hereinafter, however, it is important to the present invention that the elastomic polymer comprise at least one active group containing an alkali metal atom when it is treated to incorporate the conjugated diolefin linkage. As a result elastomeric polymers prepared with free-radical or cationic initiators as well as those produced with an anionic initiator and then treated to deactivate the active site must be metallated to incorporate at least one such active site prior to treatment to incorporate the conjugated diolefin linkage. Metallization may, of course, be accomplished using techniques well known in the prior art such as the method taught in U.S. Pat. No. 4,145,298, the disclosure of which patent is herein incorporated by reference. Polyolefin elastomers containing ethylenic unsaturation could, of course, be easily metallated using these techniques. Notwithstanding that any elastomeric polymer may be used in the present invention, elastomers prepared with an anionic initiator and then treated to incorporate a conjugated diolefin linkage before deactivation of the active site are preferred and the invention will be described in greater detail be reference to such polymers. Any metallated polymer containing an alkali-metal atom may, however, be substituted for such active, living polymers.

In general the elastomeric homopolymers and copolymers most useful in this invention will be prepared by contacting the monomer or monomers with an organo alkali metal compound in a suitable solvent at a temperature within the range from about $-150°$ C. to about 300° C. Particularly effective polymerization initiators are organo lithium compounds having the general formula $RLi_n$ wherein R is an aliphatic, cycloaliphatic or aromatic hydrocarbon radical having from 1 to 20 carbon atoms and n is an integer of 1 to 4. In general, the elastomeric polymers useful in the present invention will have a molecular weight within the range from about 2,000 to about 200,000 and when the elastomeric polymer is a copolymer of one or more diolefins and one or more other monomers, the elastomeric polymer will comprise from about 20 to about 99 wt% monomeric diolefin units. At this point, it should again be noted, that it is essential to the present invention that the elastomeric homopolymer or copolymer be a living polymer; i.e., contain at least one active group, such as an alkali metal atom bonded to a carbon atom, which can be treated so as to incorporate a conjugated diolefin group by the methods of this invention.

Elastomeric homopolymers and copolymers useful in the present invention include those terminally reactive homopolymers and copolymers described in U.S. Pat. Nos. 3,135,716; 3,150,209; 3,496,154; 3,498,960; 4,145,298 and 4,238,202, the disclosure of which patents are herein incorporated by reference, particularly those homopolymers and copolymers having only 1 terminal lithium atom and described in U.S. Pat. Nos. 3,150,209; 3,496,154; 3,498,960; 4,145,298 and 4,238,202. In general, the elastomers taught by these patents may be polymers of one or more conjugated dienes containing from 4 to about 12 carbon atoms such as 1,3-butadiene, isoprene, piperylene, methylpentyl diene, phenylbutadiene, 3,4-dimethyl-1,3-hexadiene, 4,5-diethyl-1,3-octadiene and the like, preferably those containing 4 to 8 carbon atoms. Moreover, one or more of the hydrogen atoms in these conjugated diolefins may be substituted with halogen. The elastomeric polymers may also be copolymers of one or more of the aforementioned conjugated diolefins and one or more other monomers. Other monomers which may be used include aryl substituted olefins such as styrene, various alkyl styrenes, paramethoxystyrene, vinyl naphthalene, vinyl toluene, and the like, heterocyclic nitrogen-containing monomers, such as pyridine and quinoline derivatives containing at least one vinyl or alphamethylvinyl group such as 2-vinylpyridine, 3-vinylpyridine, 4-vinylpyridine and the like.

In addition to the forgoing polymers, other block copolymers useful in the present invention may be prepared in accordance with the methods described in U.S. Pat. Nos. 3,231,635; 3,265,765 and 3,322,856. In practicing these methods, however, care should be exercised to produce block copolymers having the general formula $B_x$—$(A$—$B)_y$ or $A_x$—$(B$—$A)_y$ wherein x is a number equal to 0 or 1 and y is a whole number from 1 to about 15. A and B are as defined in the aforementioned U.S. Pat. Nos. 3,231,635; 3,265,765 and 3,322,856.

In one process embodiment of the present invention and as indicated supra, the elastomeric homopolymer or copolymer useful in the present invention may be first treated so as to comprise a conjugated diolefin group, as taught in copending U.S. patent application Ser. No. 948,336, which copending application was filed concurrently herewith, the disclosure of which copending application is herein incorporated by reference, and then reacted with a preformed unsaturated polyester. Treatment of the elastomeric homopolymer or copolymer to incorporate a conjugated diolefin structure may be accomplished by reacting a so called living elastomeric homopolymer or copolymer first with a 2,3-ethylenically unsaturated aldehyde or ketone having, respectively, one of the following general formulae:

1.

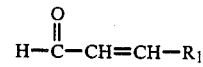

wherein $R_1$ is H, or an aliphatic, cyclic, alicyclic, aryl or aliaryl hydrocarbon radical having 1 to about 10 carbon atoms; or

2.

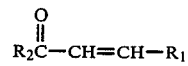

wherein $R_1$ is as defined above and $R_2$ is an aliphatic, cyclic, alicyclic, aryl or aliaryl hydrocarbon radical having 1 to about 10 carbon atoms;

and thereafter converting the resulting alkali metal salt to the corresponding alcohol and then dehydrating the alcohol. As is known in the prior art, the latter two steps may be accomplished, in effect, simultaneously when an acid is used in excess of the stoichiometric amount to convert the alkali metal salt to the corresponding alcohol at an elevated temperature.

In general, reaction of the 2,3-ethylenically unsaturated aldehyde or ketone with the living elastomeric homopolymer or copolymer will be accomplished in a suitable solvent at a temperature within the range from about 10° C. to about 150° C. Nominal holding times at reaction conditions will, generally, range from about 1 to about 120 minutes. Suitable solvents include any of the solvents known in the prior art to be effective for use during preparation of the elastomeric homopolymer or copolymer. These include hydrocarbons such as paraffins, cycloparaffins, aromatics and alkyl-substituted aromatics containing from about 4 to about 10 carbon atoms per molecule. Suitable solvents include benzene, toluene, cyclohexane, methyl cyclohexane, n-butane, n-hexane, n-heptane and the like. Since the reaction between the living elastomeric homopolymer or copolymer and the 2,3-ethylenically unsaturated aldehyde or ketone proceeds stoichiometrically, it will, generally, be sufficient to use 1 mol of 2,3-ethylenically unsaturated aldehyde or ketone per mol of alkali metal active sites in the living elastomeric polymer to be treated although lesser amounts as well as excess amounts of either the aldehyde or ketone may be used.

The alkali metal salt produced by reacting the living elastomeric homopolymer or copolymer with a 2,3-ethylenically unsaturated aldehyde or ketone is next converted to the corresponding alcohol. Any of the methods known in the prior art to be effective for such conversion may be used in the present invention. One such method is to simply react the alkali metal salt with an acid. In general, this reaction will be accomplished in a suitable solvent such as those solvents heretofore mentioned as useful for the aldehyde or ketone reaction with the elastomeric polymer. In general, any acid, organic or inorganic, may be used. Suitable acids, then include, but are not limited to, the series of aliphatic carboxylics acids starting with formic acid, the series of aromatic carboxylic acids starting with benzoic acid and the various mineral acids such as hydrochloric acid, nitric acid, sulphuric acid and the like. After the corresponding alcohol has been produced, the same will then be dehydrated, while still in solution, to yield the desired conjugated diolefin structure. Generally, this may be accomplished simply by heating the alcohol. More expediently, however, this may be accomplished by effecting the acid treatment at an elevated temperature. In a preferred embodiment of the present invention, then, the acid treatment will be accomplished at a temperature within the range of from about 40° C. to about 205° C. Generally, nominal holding times at a temperature within the foregoing range within the range of from about 1 to about 120 minutes will be sufficient to permit both conversion of the lithium salt to the corresponding alcohol and dehydration of the alcohol. Again, conversion of the alkali metal salt to the alcohol will occur on a stoichiometric basis, however, an excess of acid will catalyze the dehydration reaction. Generally, then, a slightly greater than stoichiometric amount of acid will be used to effect the conversion. The elastomeric homopolymer or copolymer containing the conjugated diolefin structure may be recovered as a crumb from solution using conventional technology well known in the prior art or the same may be used directly in the next step in the preparation of a modified unsaturated polyester.

In this one process embodiment the elastomeric homopolymer or copolymer containing the conjugated diolefin structure is next reacted with a preformed unsaturated polyester. In general, the reaction between the preformed polymers will be accomplished in a suitable solvent such as those solvents heretofore described as useful in the previous steps. As indicated, supra, the reaction will constitute a 4+2 Diels Alder addition involving the conjugated diolefin group incorporated into the elastomeric polymer and an ethylenically unsaturated linkage having a polar group on at least one adjacent carbon atom in the unsaturated polyester. In general, and when the modified unsaturated polyester is to be used in a molding composition, it will not be necessary to incorporate more than an average of about one elastomeric segment into the unsaturated polyester. Moreover, when the unsaturated polyester has been preformed using vinyl substituted monocarboxylic acids, care should be exercised to ensure that no more than about one vinyl group is reacted with an elastomeric segment containing a conjugated diolefin group. Notwithstanding this, it is contemplated in the present invention to incorporate more than one treated elastomeric segment per polyester segment, particularly when relatively high molecular weight unsaturated polyesters containing unsaturated dicarboxylic acid monomer units are used.

In general, reaction between the conjugated diolefin group of the treated elastomeric polymer and an ethylenically unsaturated linkage in an unsaturated polyester will be accomplished at a temperature within the range from about 10° C. to about 205° C. In this regard, and as is well known in the prior art, higher temperatures within this range will be required to effect reaction between the conjugated diolefin group and the ethylenic unsaturation when the ethylenic unsaturation has only one adjacent active polar group. Moreover, higher temperatures within this range will be required if the ethylenic unsaturation is hindered. The lower temperatures within this range are, of course, effective when the ethylenic unsaturation has two adjacent active groups and said ethylenic unsaturation is otherwise unhindered. In general, the pH will be maintained at a value within the range of from about 1 to about 7 during the Diels Alder addition reaction. Nominal holding times within the range from about 1 to about 240 minutes will be sufficient to permit the reaction to proceed to completion. Again, the 4+2 Diels Alder addition will proceed on a stoichiometric basis.

In general, and in molding compositions comprising such modified polyester, the modified polyester will comprise from about 10 to 100 mol% of the total polyester used in the composition. As a result, at least two methods may be used to produce the desired blend of modified unsaturated polyester and the unmodified unsaturated polyester. For example, when the unsaturated polyester resin composition is to comprise less than 100 mol% of modified unsaturated polyester a sufficient amount of treated elastomeric polymer may be added to an unsaturated polyester to convert the desired percentage thereof, less than 100 mol %, to a modified unsaturated polyester. Alternatively, the unsaturated polyester may be modified on a stoichiometric basis and the thus modified unsaturated polyester then combined with the desired amount of unmodified unsaturated polyester. This latter method does, of course, permit the use of an unsaturated polyester different from the one that was modified.

In a second process embodiment of the present invention, the elastomeric homopolymer or copolymer which has been treated so as to contain a conjugated diolefin group will first be reacted with a monomeric dienophile and then, in effect, used as a monomer in the preparation of an unsaturated polyester. In this regard, it should be noted that the treated elastomeric polymer may be reacted with any one of the dicarboxylic acids heretofore mentioned as well as any one of the vinyl monocarboxylic acids identified above. The elastomeric polymer which will now contain at least one terminal carboxyl group may then be substituted for a portion of the unsaturated dicarboxylic acid monomer or a portion of the vinyl substituted monocarboxylic acid monomer in any one of the aforementioned processes for producing an unsaturated polyester. The conditions used to react the treated elastomeric polymer with the monomeric dienophile will, of course, be identical to those used in reacting the treated elastomeric polymer with a preformed unsaturated polyester. The conditions used in the preparation of the unsaturated polyester, when using the treated elastomeric polymer containing at least one carboxyl group as a monomer, will also be identical to the conditions used in the aforeidentified processes for preparing such polyesters.

Again, when a thermosetting polyester resin composition containing polyester which is less than 100% modified polyester is prepared, two methods may be used to prepare a mixture of modified polyester and unmodified polyester suitable for use in a thermosetting resin composition. In one such method, the amount of monomer comprising an elastomeric polymer segment actually substituted for acid in the condensation reaction may be controlled so as to yield a polyester resin mixture comprising the desired amount of modified polyester and the desired amount of unmodified polyester. In a second such method, a sufficient amount of treated elastomeric polymer will be substituted for unsaturated dicarboxylic acid monomer or vinyl substituted monocarboxylic acid monomer to produce a polyester containing the desired number of appendant elastomeric homopolymer or copolymer segments per polyester segment and the thus produced modified polyester then added to a sufficient amount of unmodified polyester to yield the desired composition for use in a thermosetting polyester resin. In either of these methods, the polyester is, in effect, reacted with or grafted onto one or more of the treated elastomeric polymers at the site of the monomeric dienophile.

As indicated, supra, the modified unsaturated polyesters of this invention are particularly useful in thermosetting polyester resin compositions. The modified unsaturated polyesters of this invention contain at least one elastomeric segment which imparts impact resistance to the molded product. Since the elastomeric segment is chemically bonded in the modified unsaturated polyester the improved impact resistance is achieved without destructive phase separation or rubber bleeding to the surface during formation of the molded article.

In general, the modified polyester of this invention will comprise from about 1 to about 95 wt% of the thermosetting polyester composition. The composition may also comprise from about 0 to about 95 wt% of an unmodified unsaturated polyester, which unmodified unsaturated polyester may be the same or different than the one which was modified. The thermosetting unsaturated polyester resin composition will also comprise a vinyl monomer which acts both as a solvent and as a crosslinking agent. In general, the vinyl monomer will comprise from about 5 to about 50 wt% of the thermosetting composition. The thermosetting composition will, generally, also comprise a curing agent. In general, the curing agent will comprise from about 0.001 to about 1 wt% of the thermosetting composition. The thermosetting composition may also comprise a filler, a reinforcing agent and a thickener. When a filler is used, the same will, generally, comprise from about 5 to about 70 wt% of the thermosetting composition. When a reinforcing agent is used, the same will, generally, comprise from about 5 wt% to about 90 wt% of the composition. When a thickener is used, the same will, generally, comprise from about 0.1 to about 5 wt% of the thermosetting composition.

In general, any of the vinyl monomers known to be useful in the prior art for crosslinking moldable compositions may be used in the thermosetting resin composition of the present invention. Suitable vinyl monomers include the styrene monomers and substituted derivatives thereof such as, for example, styrene, α-methylstyrene, aminostyrene, methylethylaminostyrene, methoxystyrene, chlorostyrene, dichlorostyrene, dimethylstyrene, trimethylstyrene, t-butylstyrene, sodium styrenesulfonate, p-benzylstyrene, p-phenoxystyrene and similar aryl-substituted styrenes. Suitable monomers also include β-hydrocarbyl-substituted derivatives of acrylic acid in which the alkyl group has 1 to 8 carbon atoms such as, for example, ethylacrylic acid, propylacrylic acid, butylacrylic acid, amylacrylic acid, hexylacrylic acid, heptylacrylic acid, octylacrylic acid, phenylacrylic acid and vinylacrylic acid. Suitable vinyl monomers also include various acrylates and substituted acrylates such as methylacrylate, methyl methacrylate, ethyl acrylate, butyl methacrylate, butyl acrylate and the like. In addition to the foregoing vinyl compounds, any $CH{=}C{<}$ group containing monomers may be utilized if desired.

In general, any of the curing agents known in the prior art to be effective for use in thermosetting unsaturated polyester resins may be used in the composition of the present invention. Generally, curing agents are conventional free radical polymerization initiators, particularly organic peroxides and hydroperoxides. Suitable curing agents then, include benzoyl peroxide, dicumyl peroxide, methyl ethyl ketone peroxide, lauryl peroxide, cyclohexanone peroxide, t-butyl perbenzoate, t-butyl hydroperoxide, t-butyl benzene hydroperoxide, cumene hydroperoxide t-butyl peroctoate and the like. In addition, various azo compounds such as azobisisobutyronitrile may be used. A particularly preferred curing agent is t-butyl perbenzoate.

In general, any of the fillers known in the prior art to be useful in thermosetting polyester resins may be used in the thermosetting resin composition of the present invention. Suitable fillers include calcium carbonate, calcium silicate, silica, calcined clay, chalk, talc, limestone, anhydrous calcium sulfate, barium sulfate, asbestos, powdered glass, quartz, aluminum hydrate, aluminum oxide, antimony oxide and the like. Similarly, any of the reinforcing agents known to be useful in thermosetting polyester resins may be used in the thermosetting composition of this invention. Suitable reinforcing agents, then, include fibers of glass, metal silicates, asbestos, celluose, carbon, graphite, polyesters, polyacryls, polyamides and polyolefins. Chopped glass fibers are particularly effective for use as reinforcing agents. In general, any of the thickening agents known in the prior art to be effective for use in thermosetting polyester resin compositions may be used in the composition of the present invention. Suitable thickeners include oxides and/or hydroxides of metals of Group II of the Periodic Table and are selected from oxides and hydroxides of magnesium, calcium, strontium, barium and zinc. The hydroxides of magnesium and/or calcium are particularly effective thickening agents.

In addition to the previous named components, the thermosetting unsaturated polyester resin composition may also comprise pigments, colorants, lubricants, stabilizers, silane coupling agents and the like. In this regard, it should be noted that conventional colorants and pigments such as $TiO_2$, carbon black, phthalocyanide pigment and the like and mixtures thereof, are employed as desired in amounts sufficient to give the desired color to the final molded product. It should also be noted that lubricants such as aluminum, barium, calcium, magnesium or zinc stearate and the like may be used to impart mold release properties to the composition.

The ingredients of the thermosetting resin composition of this invention may be combined by a mixing technique which involves moderate to high shear agitation. This can be accomplished by means of twin rotor mixers designed to give moderate shear to the paste-like ingredients. It is essential to provide some shear and because of the viscosity of the materials being mixed, proper mixing cannot be obtained simply by stirring or by using a conventional impeller mixer. On the other hand, high intensity mixing which would generate excessive heat (about 35° C.) and activate the catalyst must be avoided. Sheet molding compounding line mixing equipment can also be used. This mixing under sufficient shear to achieve good dispersion of the ingredients without heat buildup sufficient to activate the catalyst insures a good blend and is necessitated by the fact that the resin composition may contain normally solid material. Shear which gives a heat buildup of, preferably, 2°–30° C. is particularly satisfactory. Low shear is preferred for BMC to avoid glass degradation.

The modified unsaturated polyester and the unmodified unsaturated polyester may be blended before incorporation into the molding composition or each may be added separately during the mixing. Preferably, however, the polyesters will be blended before incorporation in the molding composition.

The thermosetting polyester resin composition of this invention may be cured at conditions known to be effective for this purpose in the prior art. Generally, temperatures within the range of from about 100° C. to about 200° C. and a time of about 1 to about 15 minutes is sufficient.

5. Preferred Embodiment

In a preferred embodiment of the present invention, a preformed polyester comprising unsaturated dicarboxylic acid or anhydride and dihydric alcohol monomeric units will be modified by reaction with a block copolymer comprising a single alkenyl-substituted aromatic hydrocarbon block and a single diolefin block and having a conjugated diolefin linkage on or in the diolefin block. In a most preferred embodiment, the preformed polyester will comprise from about 5 to about 50 mol% of maleic acid or maleic anhydride monomer units and about 50 mol% of propylene glycol monomer units. The preferred polyester may also comprise from about 0 to about 45 mol% of saturated dicarboxylic acid or anhydride monomeric units. The block copolymer will be prepared with an organo lithium compound using the method described in U.S. Pat. No. 3,231,635 and may be represented by the general formula A—B, wherein A and B are, respectively, polymer blocks of an alkenyl substituted aromatic hydrocarbon and a conjugated diolefin. In the preferred embodiment, the alkenyl-substituted aromatic hydrocarbon block will have a weight average molecular weight within the range of from about 2,000 to about 30,000 and the conjugated diene block will have a weight average molecular weight within the range from about 2,000 to about 90,000. In a most preferred embodiment, the alkenyl-substituted aromatic hydrocarbon will be styrene and the conjugated diolefin will be either butadiene or isoprene.

In the preferred embodiment, the block copolymer will be treated so as to incorporate a conjugated diolefin group by first contacting the living polymer obtained from the polymerization process with acrolein to produce the lithium salt and then with sulfuric acid at an elevated temperature to, in effect, simultaneously form the corresponding alcohol and dehydrate the same. The thus treated block copolymer is next reacted with a preformed polyester. In the preferred embodiment, the treated block copolymer will be mixed with a molar excess of the preformed polyester and the reaction carried substantially to completion such that the resulting modified polyester will contain an average of roughly one block copolymer (elastomeric) segment per polyester segment. In the preferred embodiment, the treatment of the block copolymer will be accomplished in the same solvent as was used during the preparation of the block polymer. The reaction between the conjugated diene group and an ethylenically unsaturated group in the polyester will be accomplished at a temperature within the range from about 25° to about 125° C. As indicated supra, the reaction is a 4+2 Diels Alder addition and results, in effect, in the grafting of the block copolymer to the polyester through a cyclic structure comprising 6 carbon atoms. The preferred modified unsaturated polyesters of this invention are particularly effective, when used in thermosetting unsaturated polyester resin compositions, in imparting improved surface characteristics (less shrinkage) and improved impact resistance to the molded products. Moreover, these improved properties are realized without the risk of destructive phase separation which has heretofore been experienced when elastomeric polymers were incorporated into a themosetting unsaturated polyester composition.

In a preferred thermosetting unsaturated polyester resin composition, a modified unsaturated polyester within the scope of the present invention will, in effect, be substituted for from about 50 to about 100 wt% of the conventional unsaturated polyester normally used in such compositions. A preferred thermosetting unsaturated polyester resin composition will, then, comprise from about 40 to about 80 wt% of a modified unsaturated polyester within the scope of the present invention and from about 0 to about 40 wt% of an unmodified or conventional unsaturated polyester. As used herein, the recitation "unmodified unsaturated polyester" is intended to means any unsaturated polyester known in the prior art which is not chemically combined with an elastomeric homopolymer or copolymer through a 6-member ring. The recitation "conventional unsaturated polyesters" is intended to means any of those commercially available unsaturated polyesters which are commonly used in thermosetting polyester resin compositions. It will, of course, be appreciated that incorporation of the modified unsaturated polyester into the composition effectively incorporates from about 1 to about 50 wt% of an elastomeric polymer into said composition.

In addition to the modified and unmodified unsaturated polyesters, a preferred thermosetting unsaturated polyester resin will also comprise from about 5 to about 50 wt% of an ethylenically unsaturated monomer capable of functioning as both a solvent and as a crosslinking agent. In a most preferred composition, the vinyl monomer will be styrene. A preferred thermosetting composition will also comprise from about 0.1 to about 0.5 wt% of a curing agent.

Having thus broadly described the present invention and a preferred embodiment thereof, it is believed that the same will become even more apparent by reference to the following examples. It will be appreciated, however, that the examples are presented solely for purposes of illustration and should not be construed as limiting the invention.

EXAMPLE 1

In this example, a styrene-butadiene block copolymer was prepared as a control or base line sample. The block copolymer was prepared under anhydrous and anaerobic conditions in a closed, glass reaction vessel. Initially, 13.1 g of styrene dissolved in 170 g of cyclohexane was charged to the reaction vessel along with 100 $\mu$l of n-butoxy, t-butoxy ethane and 3 ml of a 0.25N solution of s-butyl lithium. The reaction vessel was heated to 50° C. and when the polymerization of styrene was substantially complete 24.1 g of polymerization grade butadiene monomer was added to the vessel. Polymerization of the diene monomer was allowed to proceed substantially to completion and the resulting styrene-butadiene living block copolymer was quenched by the addition of an excess of methyl alcohol. The nonfunctionalized styrenebutadiene block copolymer was then recovered as crumb by coagulation with and excess of methyl alcohol. Analysis of the recovered product indicated that the block copolymer contained a single block of styrene having a weight average molecular weight of 13,400 and a single butandiene block having a weight average molecular weight of 29,400.

EXAMPLE 2

In this example, 3 styrene-butadiene block copolymers containing a single acrolein end group were prepared. For convenience, these polymer samples have been identified as A thru C. Each sample was prepared by repeating the polymerization steps summarized in Example 1 but before deactivating the lithium atom with methyl alcohol the living diblock copolymer was titrated with acrolein until the pale yellow color of the living anionic polymer had disappeared. The end-capped block copolymer was then contacted with an aliquot of ammonium chloride in methyl alcohol to deactivate the lithium atom. Each of the three samples were recovered by coagulating with an excess of methyl alcohol. After recovery, each sample was analyzed to determine the weight average molecular weight of each block and the amount of coupled products in each sample. These results are shown in the following table:

| Acrolein Capped Block Copolymers | A | B | C |
|---|---|---|---|
| Mol. Wt. of Styrene Block ($\times 10^{-3}$) | 14.4 | 13.3 | 13.3 |
| Mol. Wt. of Butadiene Block ($\times 10^{-3}$) | 29.1 | 29.1 | 29.5 |
| Coupled Product (wt %) | 4 | 5 | 5 |

EXAMPLE 3

In this example, the acrolein capped polymers identified as A and B in Example 2 were combined and dissolved in 600 ml cyclohexane. The solution was then divided into two equal sized aliquots and each aliquot treated with an excess of maleic anhydride to produce an elastomer having a cyclic anhydride moiety chemically bonded thereto through a 6-carbon atom cyclic structure containing one C,C double bond and to dehydrate the alcohol which was produced in Example 2. The treatment was accomplished by adding 0.25 g of maleic anhydride to each aliquot and then heating both to reflux and holding each at this temperature for four hours. The resulting reaction products were then recovered as a crumb by coagulating in excess methyl alcohol. The elastomer thus produced could be substituted for a portion of the unsaturated dicarboxylic acid or anhydride monomer in any of the polyester resin operations hereinbefore discussed.

EXAMPLE 4

In this example, the acrolein capped polymer identified as C in Example 2 was dissolved in 215 ml xylene and combined with 10 g of a maleate/propylene glyclol unsaturated polyester resins (Koppers 3702-5 unsaturated polyester resin). Three drops of concentrated $H_2SO_4$ were then added to this solution and the solution heated to reflux temperature and held for four hours. The $H_2SO_4$, inter alia, acted as a catalyst for the Diels Alder reaction. As a result of this treatment, the alcohol produced in Example 2 was dehydrated and the conjugated diolefin group produced then reacted with the maleate/propylene glyclol unsaturated polyester resin. The product was contacted with an excess of methyl alcohol, a good solvent for the polyester resin. As a result of the contacting with methanol, the reaction product of the end-capped elastomer and the polyester and any unreacted end-capped elastomer were precipitated while any unreacted polyester remained in solution. After separation, the coagulated product was subjected to IR analysis to confirm the presence of grafted polyester therein. This was confirmed by a peak occurring at 1640 $cm^{-1}$. Signals in the IR spectrum at 690 $cm^{-1}$ and 920 $cm^1$ also indicated that the coagulated product contained styrene-butadiene block copolymer. The relative intensities of the IR signals indicated that the modified polyester contained significant amounts of both of the polymeric reactants.

EXAMPLE 5

In this example, a portion of the block copolymer produced in Examples 1 and a portion of the acrolein modified block copolymer produced in Example 2 and identified as C were dissolved in styrene monomer at a concentration of 30 wt% polymer in said solution. A 50 g aliquot of each solution was then treated with 3 drops of sulfuric acid and blended with an equal weight of solution (about 70 wt% unsaturated polyester) containing Koppers 3702-5 unsaturated polyester, the same polyester which was modified in Example 4, in styrene. The blending was accomplished at 500 rpm for 3 minutes using a 1" jiffy blade positioned in an 8 oz jar. Each of the blends were then set aside and observed to determine whether gross phase separation would occur. The observations are summarized in the following table:

| Blend | Phase Separation |
|---|---|
| with polymer of example 1 | complete after 2 days |
| with polymer of example 2 | no separation after 7 days |

EXAMPLE 6

In this example, blends were prepared with the polymers described in examples 1 and 4 and Koppers 3702-5 polyester. These resin blend were then used in the preparation of Sheet Molding Compound pastes. Each of the pastes were prepared according to the following recipe:
100 g Block Copolymer in Styrene Monomer (30 wt% polymer)
100 g Koppers 3702-5 Unsaturated Polyester Resin (70 wt% in styrene)
300 g Calcium Carbonate
6 g Zinc Stearate
0.5 g Black pigment
2.6 g t-Butyl perbenzoate
0.5 g PEP-100 Cure Promoter
7.8 g Marinco H Thickening Agent
Each paste was blended in an 800 ml plastic beaker using a 1" Jiffy Mixer blade at 500 rpm. The fully blended pastes were then transferred to 16 oz jars, sealed and set aside to age. After 18 days, the paste were inspected to access the homogeneity of the blend. The paste samples were evaluated for (1) the lack of exudate formation, (2) the absence of chalkiness and (3) smoothness. Each criteria was rated on a scale from 1 (worst) to 5 (best) so that a superior paste would get a combined score of 15, and the worst possible score would be 3. The results of each of the paste are summarized in the following table:

| Paste | Numerical Rating |
|---|---|
| with polymer of example 1 | 3 |
| with polymer of example 4 | 9 |

While the present invention has been described and illustrated by reference to particular embodiments thereof, it will be appreciated by those of ordinary skill in the art that the same lends itself to variations not necessarily illustrated herein. For this reason, then, reference should be made solely to the appended claims for purposes of determining the true scope of the present invention.

Having thus described and illustrated the invention what is claimed is:

1. An unsaturated polyester modified by having at least one elastomeric polymer segment chemically bonded thereto via a Diels-Alder 4+2 addition, said chemical bond comprising a cyclic member containing 6 carbon atoms.

2. The polyester of claim 1 wherein said unsaturated polyester comprises unsaturated dicarboxylic acid or anhydride monomer units.

3. The polyester of claim 2 wherein said elastomeric polymer segment is a homopolymer of a diolefin having from 4 to 12 carbon atoms.

4. The polyester of claim 2 wherein said elastomeric polymer segment is a copolymer of an alkenyl-substituted aromatic hydrocarbon and a diolefin having from 4 to 12 carbon atoms.

5. The polyester of claim 4 wherein said copolymer is a block copolymer.

6. The polyester of claim 5 wherein said block copolymer comprises a single block comprising an alkenyl-substituted aromatic hydrocarbon and a single block comprising a diolefin.

7. The polyester of claim 1 wherein one carbon atom in said conjugated diolefin linkage required for the Diels-Alder 4+2 addition was contained in a diolefin monomeric unit of said elastomeric polymer segment.

8. The polyester of claim 1 wherein one of the carbon atoms in the conjugated diene linkage required for the Diels-Alder 4+2 addition was contained in the alkenyl portion of an alkenyl-substituted aromatic hydrocarbon monomer unit of said elastomeric polymer segment.

9. A thermosetting unsaturated polyester resin composition comprising an unsaturated polyester having at least one segment of an elastomeric homopolymer or copolymer chemically bonded thereto via a Diels-Alder 4+2 addition, said chemical bond comprising a cyclic structure containing 6 carbon atoms, and a vinyl monomer.

10. The thermosetting unsaturated polyester resin of claim 9 wherein said elastomeric polymer is a homopolymer of a diolefin containing from 4 to 12 carbon atoms.

11. The thermosetting unsaturated polyester resin composition of claim 9 wherein said elastomeric polymer is a copolymer of an alkenyl-substituted aromatic hydrocarbon and a diolefin having from 4 to 12 carbon atoms.

12. The thermosetting unsaturated polyester resin composition of claim 11 wherein said copolymer is a block copolymer.

13. The thermosetting unsaturated polyester resin composition of claim 12 wherein said block copolymer comprises a single block comprising alkenyl-substituted aromatic hydrocarbon monomer units and a single block comprising diolefin monomer units.

14. The thermosetting unsaturated polyester resin composition of claim 9 wherein said unsaturated polyester comprises vinyl substituted monocarboxylic acid monomer units.

15. A thermosetting unsaturated polyester resin composition comprising an unmodified unsaturated polyester, and unsaturated polyester modified by having at least one segment of an elastomeric homopolymer or copolymer chemically bonded thereto via a Diels-Alder 4+2 addition, said chemical bond comprising a cyclic structure containing 6 carbon atoms, and a vinyl monomer.

16. The thermosetting unsaturated polyester resin of claim 15 where in said elastomeric polymer is a homopolymer of a diolefin containing from 4 to 12 carbon atoms.

17. The thermosetting unsaturated polyester resin composition of claim 15 wherein said elastomeric polymer is a copolymer of an alkenyl-substituted aromatic hydrocarbon and a diolefin having from 4 to 12 carbon atoms.

18. The thermosetting unsaturated polyester resin composition of claim 17 wherein said copolymer is a block copolymer.

19. The thermosetting unsaturated polyester resin composition of claim 18 wherein said block copolymer comprises a single block comprising alkenyl-substituted aromatic hydrocarbon monomer units and a single block comprising diolefin monomer units.

20. The thermosetting unsaturated polyester resin composition of claim 15 wherein said unmodified unsaturated polyester comprises unsaturated dicarboxylic acid or anhydride monomer units.

21. The thermosetting unsaturated polyester resin composition of claim 15 wherein said unmodified unsaturated polyester comprises vinyl substituted monocarboxylic acid monomer units.

22. A method of reacting or grafting an elastomeric polymer with or onto an unsaturated polyester comprising the steps of:
  (a) treating a preformed elastomeric polymer so as to incorporate a conjugated diolefin group;
  (b) reacting said conjugated diolefin group with an ethylenically unsaturated group in an unsaturated polyester via a Diels-Alder 4+2 addition so as to chemically combine said elastomeric polymer and said unsaturated polyester through a cyclic hydrocarbon structure comprising 6 carbon atoms; and
  (c) recovering a modified polyester.

23. The process of claim 22 wherein said elastomeric polymer is a homopolymer of a diolefin having from 4 to 12 carbon atoms.

24. The process of claim 22 wherein said elastomeric polymer is a copolymer of an alkenyl-substituted aromatic hydrocarbon and a diolefin having from 4 to 12 carbon atoms.

25. The process of claim 24 wherein said copolymer is a block compolymer.

26. The process of claim 25 wherein said block copolymer contains a single block comprising alkenyl-substituted aromatic hydrocarbon monomer units and a single block comprising diolefin monomer units.

27. The process of claim 22 wherein said elastomeric polymer contains a lithium atom bonded to a terminal carbon atom and said diolefin group is produced by first reacting the lithium alkyl with a 2,3-ethylenically unsaturated aldehyde or ketone and thereafter neutralizing the resulting salt with an acid to produce an alcohol which is then dehydrated.

28. The process of claim 27 wherein said lithium alkyl is reacted with a 2,3-ethylenically unsaturated aldehyde.

29. The process of claim 28 wherein said aldehyde is acrolein.

30. A process for grafting an unsaturated polyester onto an elastomeric polymer comprising the steps of:

(a) treating a preformed elastomeric polymer so as to incorporate a conjugated diolefin group;
(b) reacting said elastomeric polymer containing said conjugated diolefin with an unsaturated dicarboxylic acid or a vinyl substituted monocarboxylic acid via a 2+4 Diels-Alder addition; and
(c) using the reaction product from step (b) as a monomer in a polyester polymerization process.

31. The process of claim 30 wherein said elastomeric polymer is reacted with an unsaturated dicarboxylic acid and the reaction product then substituted for a portion of unsaturated dicarboxylic acid used in a process to produce a polyester by condensing an unsaturated dicarboxylic acid with a polyhydric alcohol.

32. The process of claim 30 wherein said elastomeric polymer is reacted with a vinyl-substituted monocarboxylic acid and the reaction product then substituted for a portion of vinyl-substituted monocarboxylic acid monomer in a process wherein a polyester is produced by condensing a vinyl-substituted monocarboxylic acid with a polyepoxide.

* * * * *